Dec. 16, 1958 C. N. WILLIAMSON 2,864,979
VIBRATOR STRUCTURE
Filed March 17, 1954
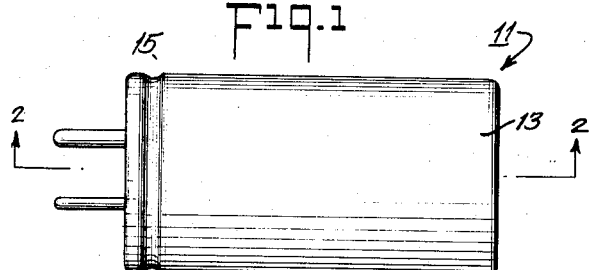
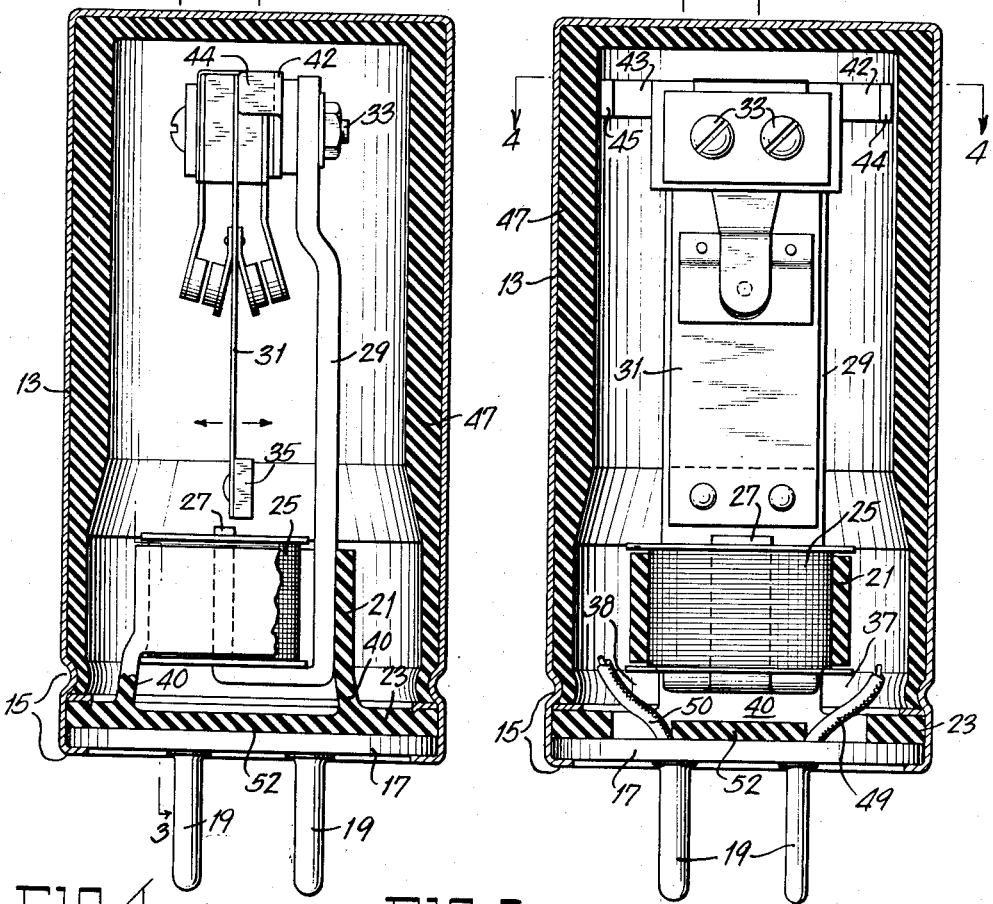
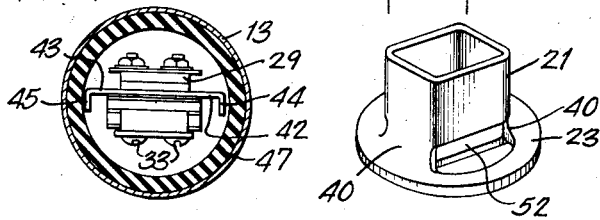
INVENTOR.
CLIFFORD N. WILLIAMSON
BY W. D. Keith,
ATTORNEY United States Patent Office 2,864,979
Patented Dec. 16, 1958

2,864,979

VIBRATOR STRUCTURE

Clifford N. Williamson, Parma Heights, Ohio, assignor to Cornell-Dubilier Electric Corp., South Plainfield, N. J., a corporation of Delaware Application March 17, 1954, Serial No. 416,854

10 Claims. (Cl. 317—182)

This invention deals with vibrators, i. e. of the type employed in electrical D. C. to A. C. converters, and is concerned specifically with a superior mounting for such type of vibrator.

The ordinary electrical vibrator that is employed in transforming direct current to alternating current gives considerable trouble in that the mechanical vibration that is set up becomes quite objectionable. There have been numerous types of construction employed which have endeavored to reduce this objectionable vibration and noise created thereby. None has been very successful.

Such noise and vibration becomes particularly objectionable when the vibrator is mounted upon a thin sheet of material so that the vibration is transferred into, and may even become amplified by, the base upon which the vibrator is mounted. Mounting in this manner is most commonly used in the very application where this type of vibrator is usually employed, e. g. in vehicular radios and similar electronic equipment that is mounted in automobiles and the like.

Although the problem of noise has been quite adequately overcome in large units where space is no consideration, in small vibrators such as contemplated here which are to be mounted by plugging into a socket, the problem has been a real one. The exact size of a given unit where the problem would arise is not determined, but clearly when a vibrator unit is such a size as those commonly employed on vehicular electronic equipment where the vibrator unit is mounted in a can with limited clearance for the vibrator elements, such can having a plug in type base for removable mounting on the chassis of the equipment, this problem exists. Prior attempts to reduce the amount of vibration and the noise created have had limited success in reducing the audible noise created by the vibrator. However, there is much room for improvement in this respect and most especially in regard to the vibration which may be set up around the vibrator.

Consequently, it is an object of this invention to provide a free floating mounting for a vibrator that will substantially eliminate the transference of any mechanical vibration.

Another object of this invention is to provide a mounting for vibrators of the type disclosed that allows the vibrator structure to float in the direction of vibration while maintaining good support therefor in the other direction.

Another object is to allow operation without damping, which is introduced when energy is absorbed from the system to vibrate external structures.

Another object of this invention is to provide a mounting for vibrators of the type described that takes into account the axis about which the mass of the vibrator will pivot, allowing the vibratory motion freely about such pivot.

A further object of this invention is to provide a tubular support that has cut out sections, or holes, therein such that the vibratory end of the vibrator may float in a minimal restrained manner while adequate support is given to the vibrator structure.

Briefly this invention is concerned with a substantially noise free electrical vibrator of the type used in a converter that has a supporting means for the vibrator assembly. This supporting means comprises a resilient means for supporting one end of the vibrator assembly and includes means for allowing free vibratory motion in the line of direction of vibration while restraining movement at any angle thereto.

For a more complete description of the invention reference is made to the drawings, illustrating a vibrator device embodying the invention wherein:

Fig. 1 is a side elevation of the vibrator showing the external construction;

Fig. 2 is an enlarged view of the interior of the vibrator partly in section taken on the line 2—2 of Fig. 1;

Fig. 3 is a view partly in section as taken along the line 3—3 in Fig. 2;

Fig. 4 is a view partly in section as taken along the line 4—4 of Fig. 3; and

Fig. 5 is a perspective showing the lower tubular supporting member for the vibrator.

Referring to Fig. 1 there is shown an external view of a vibrator 11 which includes a conventional metal can 13 that encloses the elements of the vibrator. The vibrator elements are secured within the can 13 by means of crimping as illustrated at 15. The crimping holds an insulating-material base 17 to which are attached the usual electrical connector pins 19. Also secured into position at the bottom of the vibrator 11 by means of the crimping 15 is a resilient material tubular shaped supporting member 21 that has a flanged disc like base 23.

The usual vibrator elements are shown and they consist of a coil 25 having a core 27 which is an extension of a main supporting body piece 29 that has fastened thereto at its upper end (as viewed in Figs. 2 and 3) the usual vibrator elements including spacers and supports for a vibratory reed 31 which depends from the supporting elements that are fastened to the body piece 29 in any feasible manner, as by means of a pair of bolts 33. Attached to the outer end of the reed 31 is a magnetic material armature 35. The armature 35 may be securely fastened to the end of reed 31 in any convenient manner, e. g. by riveting as illustrated.

The operation of the vibrator 11 need not be described since it is entirely conventional and consists of a making and breaking of circuits that include the contacts illustrated. Such making and breaking is accomplished by means of a vibration set up in the reed 31 due to the magnetic effect caused by the coil 25 and its core 27, in conjunction with the armature 35. It is to be noted that the tubular member 21 which is constructed of a resilient material, e. g. soft rubber, surrounds the coil 25 and the lower end of the body piece 29 like a sock, so that the lower end of the vibrator elements of the vibrator 21 may be supported thereby. It is particularly to be noted that there are two cut out sections or openings 37 and 38 (see Figs. 3 and 5) near the base of the tubular support 21. These openings 37 and 38 leave the tubular portion of the member 21 (which surrounds the coil end of the vibrator in intimate contact therewith) supported only by the sides 40. In this way, lateral movement of the tubular support member 21, in a direction generally parallel to the vibratory motion of the armature 35, to the left and to the right in Fig. 2, is practically unrestrained. This is because the openings 37 and 38 eliminate any restraint to such lateral movement except for the bending of the sides 40. Whereas, movement of the support member 21 laterally in a direction at right angles to the vibratory motion of armature 35, i. e. to the left and right as viewed in Fig. 3 is comparatively restrained, since such movement acts against the full width of the sides 40.

It is to be noted that the coil end of the vibrator has a substantially rectangular configuration so that the sides 40 of the tubular support member 21 are generally flat and lie transversely parallel to one another while sloping slightly together toward the top of the unit (as viewed in Figs. 2 and 3). For this reason, any motion of the coil end of the vibrator not in the line of directions of the vibration, will have at least some component of a restraining force applied thereto. In the line of directions of the vibrations no substantial restraint is had until the sides 40 are fully bent over to the point where they are then subjected to a stretching force. This stretching cannot occur however, until very near the maximum motion possible within the case 13 and its liner 47.

At the upper end of the vibrator assembly there is a pair of arms 42 and 43 that have bent over tips 44 and 45, respectively, at the extremities thereof. This may be a unitary structure, as illustrated, in which the tips 44 and 45 are an integral part of one stamping that forms the arms 42 and 43 and out of which are struck the tips 44 and 45. It will be observed in Fig. 3 and in Fig. 4 that these arms 42 and 43 extend sufficiently to have tips 44 and 45 just clear an inner lining 47 of the can 13. The inner lining 47 is a usual noise reducing liner and may be constructed of any resilient material, e. g. springy rubber or the like. It is to be noted that the lining 47 is spaced from the vibratory elements of the vibrator 11, so that the vibratory elements are held in a floating suspension within the can 13.

The purpose of the arms 42, 43 with their tips 44 and 45 is to support the upper end of the vibrator assembly when the assembly is in any position other than vertical. Such support is necessary even when the assembly is mounted vertically, as shown in Figs. 2 and 3, because of shocks to which the assembly will be subjected. Furthermore, when the assembly is mounted in a horizontal manner the support will be necessary to keep this end of the assembly suspended centrally of the space within the lining 47.

The vibrator assembly will tend to have an oscillatory movement about a pivot point (not shown) located outside the can 13 somewhat above the top thereof (as viewed in Figs. 2 and 3). The exact location of this pivot point depends on various factors such as the mass of the different elements and the frequency of the vibration of armature 31. In order to provide the least resistance to this oscillatory movement the bottoms of the sides 40 are located slightly wider apart than the tops thereof, so that the sides 40 slope toward each other with an inclination such that their slopes extended would intersect at the pivot point of the whole assembly. In this way the flexing of sides 40 as the assembly is vibrating is kept most nearly at right angles to the broad surfaces of these sides in order to give the least resistance to such motion.

The electrical connections from the pins 19 to the vibrator elements are conventional, and have not been shown except to illustrate the lower portion of two insulated wires 49 and 50 in Fig. 3, which illustrates the access of the electrical connections from vibrator elements within the can 13 to the pins 19, located in the base 17.

It is to be noted that the contact area of the tips 44 and 45 with the liner 47 is kept at a minimum so that when these tips 44 and 45 do contact the liner 47, to keep the upper end of the assembly in its central location as explained above, there will be a minimum amount of resistance to the free oscillatory motion of the whole assembly. When these tips 44 and 45 are in contact with the liner 47 during vibration of the assembly, they will have a combined translatory and rotational motion relative to the liner 47.

There is center section 52 of the disc like base 23 of tubular member 21, that acts to tend to hold the lead wires 49 and 50 away from the vibrator assembly. This section 52 also acts to cushion the assembly in case of shock, while at the same time it acts as an insulator to keep the body piece 29 from short circuiting any of the pins 19.

It will be observed that by means of the structure above described a free floating action is obtained whereby the lower end of the vibrator elements may swing back and forth in the direction which the armature 35 and the end of reed 31 move. In this way, this vibration which is set up, will not be transmitted to the can 13 and its base 17 to be passed on the mounting (not shown) in which the pins 19 will be secured. At the same time as this free floating action is obtained, there is maintained adequate support for the vibrator assembly within the can 13 by means of the sides 40 of the tubular member 21, which connect the upper portion of member 21 with the flanged based 23 thereof. Facilitating the free floating action while at the same time maintaining adequate support for the vibrator assembly within can 13, there are the arms 42 and 43 along with their tips 44 and 45, which act as described above, for support with a minimum of damping of any movement including a pivotal movement as well as some translation, as explained above. Thus it will be appreciated that the vibrator assembly, which must necessarily vibrate in order for the device to operate, is allowed to do so in a free floating manner within the casing 13 with a minimum of damping and so that substantially none of the vibration thus set up is transmitted out through the case 13 to its mounting.

While a specific embodiment of the invention has been described in detail in accordance with the applicable statutes, this description is not to be taken as in any way limiting the invention.

I claim:

1. A vibration reducing mounting for D. C. to A. C. converter assembly having elements including a vibrating reed with an armature at the extremity thereof to be acted upon by an electro-magnetic coil and core and having a base for electrically connecting and mechanically supporting the entire converter comprising an enclosure surrounding said elements and attached to said base, a sound absorbent resilient material lining to said enclosure, relatively rigid arms extending from said assembly near the end opposite said coil, mechanical contact surfaces at the extremities of said arms for contacting said lining at aligned points to form a support for said assembly, the axis of said aligned points being at right angles to the line of direction of vibration of the armature, said lining being spaced from said assembly, a resilient tubular mounting surrounding the coil end of said elements in intimate contact therewith, said tubular mounting extending toward said base for supporting attachment thereto, two opposite sides of said tubular mounting defining openings between the coil end of said assembly and the base to allow free movement in the line of direction of vibration of the armature and reed at right angles to the pivotal support axis formed by the arms.

2. A vibration reducing mounting for a vibrator type D. C. to A. C. converter having a vibrating reed with an armature at the free end thereof and a cored coil for acting upon said armature and causing the same to be arcuately displaced along a predetermined path comprising means for engaging the cored coil and spaced apart resilient supporting means for said last mentioned means selectively disposed substantially perpendicular to the path of displacement of said armature for permitting relatively free vibratory movement in the direction of armature displacement and restraining movement in directions removed therefrom.

3. A vibration reducing mounting for a vibrator type D. C. to A. C. converter having a vibrating reed and an electromagnetic coil for acting upon said reed and causing the same to be arcuately displaced along a predetermined path, comprising, a base member, a sleeve member sized to encompass the coil and spaced apart resilient means connecting said sleeve member to said base member selectively disposed relative to the path of displacement of said vibrating reed to define openings between said sleeve and base to allow relatively free movement parallel to the path of displacement of said vibrating reed.

4. The mounting as set forth in Claim 3, including means selectively extending from the end of said converter remote from the coil for pivotally supporting said remote end on an axis disposed perpendicular to the path of displacement of said reed.

5. A vibration reducing mounting for an enclosed vibrator assembly employed in a D. C. to A. C. converter having a vibrating reed with an armature at the free end thereof and a cored coil for acting upon said armature and causing the same to be arcuately displaced along a predetermined path comprising means for closely encompassing said cored coil and positioning the same centrally of said enclosure and resilient supporting means for said coil encompassing means selectively defining openings disposed on either side of the path of displacement of said reed and armature for permitting relatively unrestrained oscillatory movement of said cored coil about an axis disposed at right angles to the path of maximum vibratory movement of said reed and armature.

6. The mounting as set forth in claim 5 in combination with a sound absorbent resilient lining material for said enclosure and means selectively extending from the end of said assembly remote from the cored coil and terminating adjacent said lining for loosely pivotally supporting said remote end on an axis disposed perpendicular to the path of displacement of said vibrating reed.

7. A vibration reducing mounting for a vibrator type D. C. to A. C. converter having a vibrating reed with an armature at the free end thereof, a cored cool for acting upon said armature and causing the same to be arcuately displaced along a predetermined path and an open ended enclosure sized to contain said converter comprising a base member sized to be secured adjacent the open end of said enclosure, a resilient sleeve member sized to encompass the cored coil, resilient means connecting said sleeve member to said base member selectively disposed substantially perpendicular to the path of displacement of said vibrating reed for supporting said assembly relative to said base member and in relatively unrestrained manner in the line of displacement of said armature and reed.

8. A vibration reducing mounting for a vibrator type D. C. to A. C. converter having a vibrating reed with an armature at the free end thereof, a cored coil for acting upon said armature and causing the same to be arcuately displaced along a predetermined path and an open ended enclosure sized to contain said converter comprising a base member sized to be secured adjacent the open end of said enclosure, a resilient sleeve member sized to encompass the cored coil, resilient means connecting said sleeve member to said base member selectively disposed substantially perpendicular to the path of displacement of said vibrating reed for supporting said assembly relative to said base member and in relatively unrestrained manner in the line of displacement of said armature and reed, and means selectively extending from the end of the vibrator type converter remote from the cored coil for pivotally supporting said remote end on an axis substantially perpendicular to the path of displacement of said armature and reed.

9. A housing assembly for a vibrator type D. C. to A. C. converter having a vibrating reed with an armature at the free end thereof, a cored coil for acting upon said armature and causing the same to be arcuately displaced along a predetermined path comprising an open ended enclosure sized to contain said vibrator type converter, a sound absorbent resilient material lining at least for the portion of said enclosure disposed remote from the open end thereof, a closure member disposed in the open end of said enclosure for closing the same and supporting the vibrator type converter therein, means for closely encompassing the cored coil disposed adjacent said base member, means disposed intermediate said base member and said coil encompassing means for supporting said coil encompassing means in spaced relationship to said base member, said supporting means being selectively disposed to define openings on either side of the path of displacement of said reed and armature for permitting relatively unrestrained displacement of said cored coil in the path of displacement of said reed and armature.

10. The housing assembly as set forth in claim 9, including means selectively extending from the end of said vibrator type converter disposed remote from the cored coil for loosely pivotally supporting said converter on an axis substantially perpendicular to the path of displacement of said reed and armature whereby relatively unrestrained displacement of said converter is permitted parallel to the path of the armature displacement and movement in directions removed therefrom is subjected to a dampening action.

References Cited in the file of this patent

UNITED STATES PATENTS

| | | |
|---|---|---|
| 2,063,311 | Guedon | Dec. 8, 1936 |
| 2,072,578 | Barrett | Mar. 2, 1937 |
| 2,140,792 | Dressel | Dec. 20, 1938 |
| 2,190,685 | Slater | Feb. 20, 1940 |
| 2,313,379 | Wood | Mar. 9, 1943 |
| 2,339,973 | Aust | Jan. 25, 1944 |
| 2,660,639 | Brown | Nov. 24, 1953 |